United States Patent Office 3,240,080
Patented Mar. 15, 1966

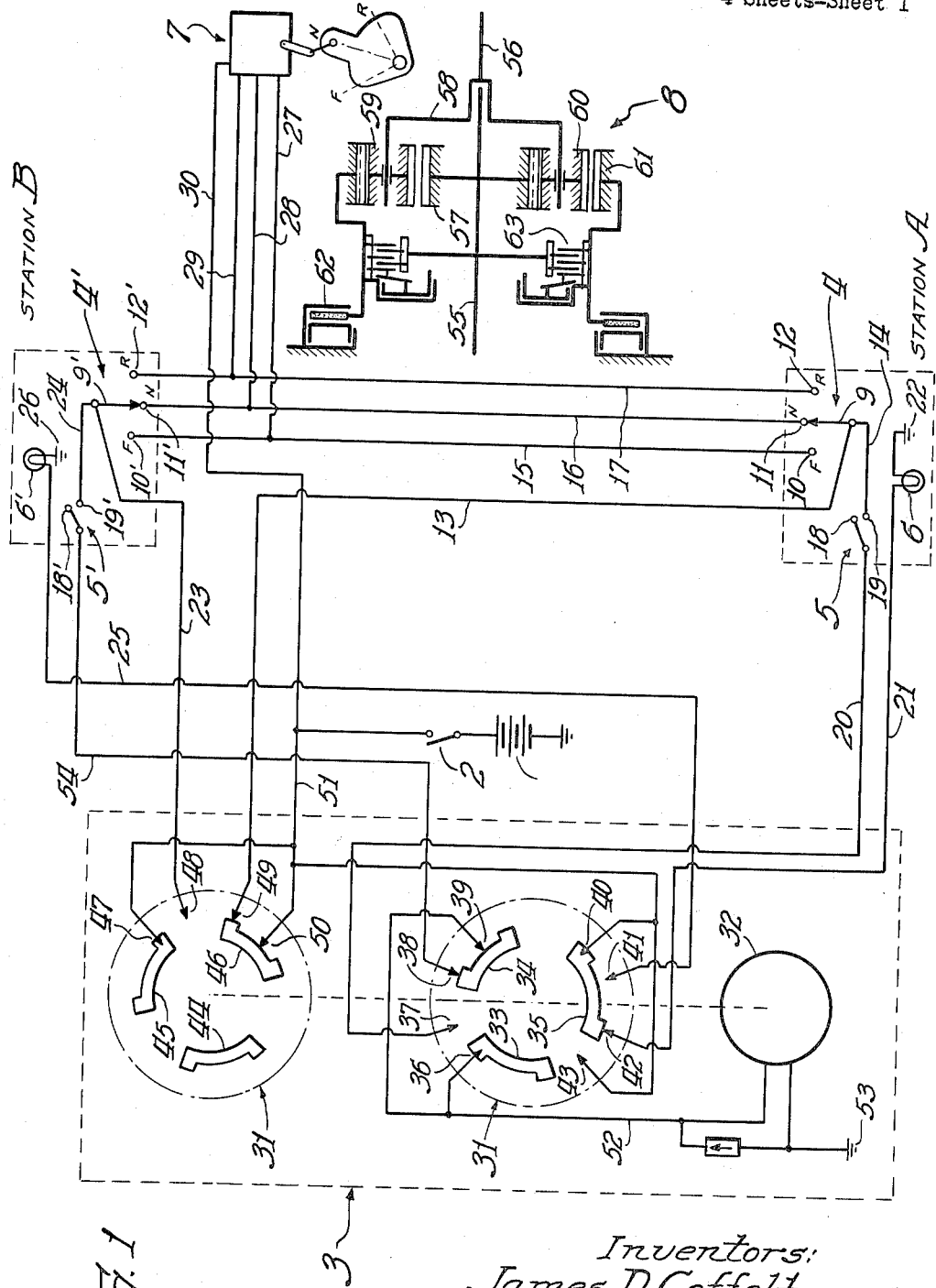

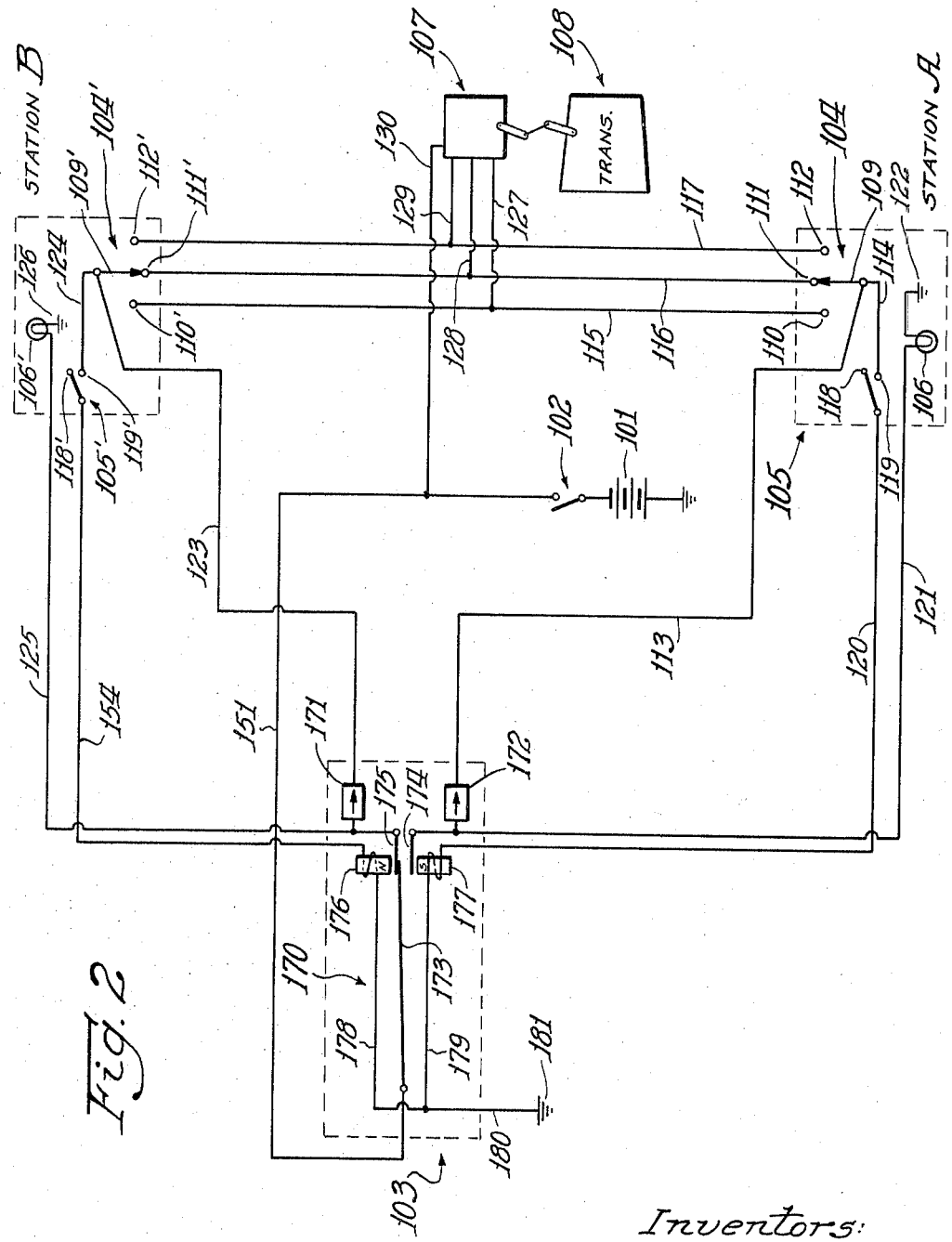

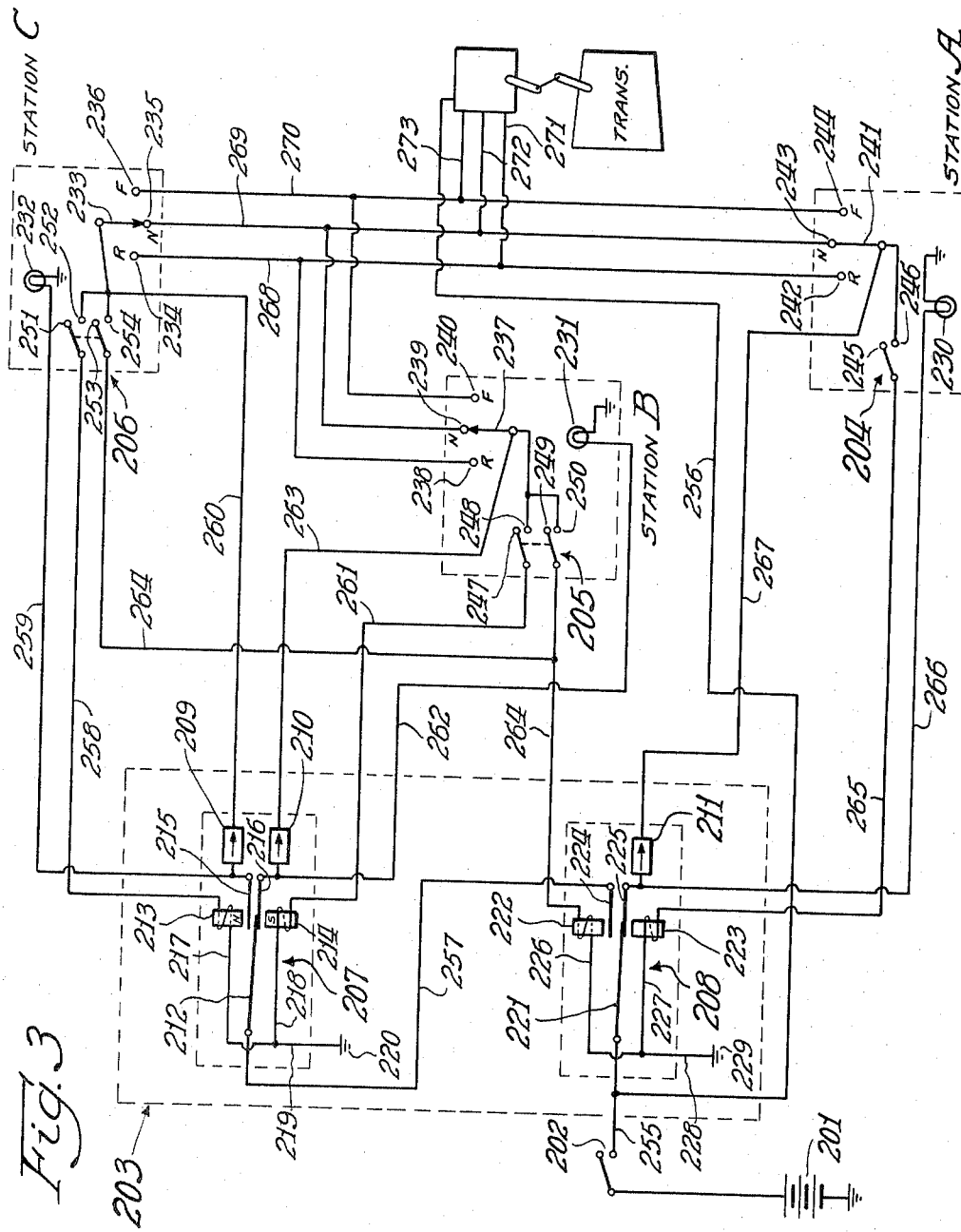

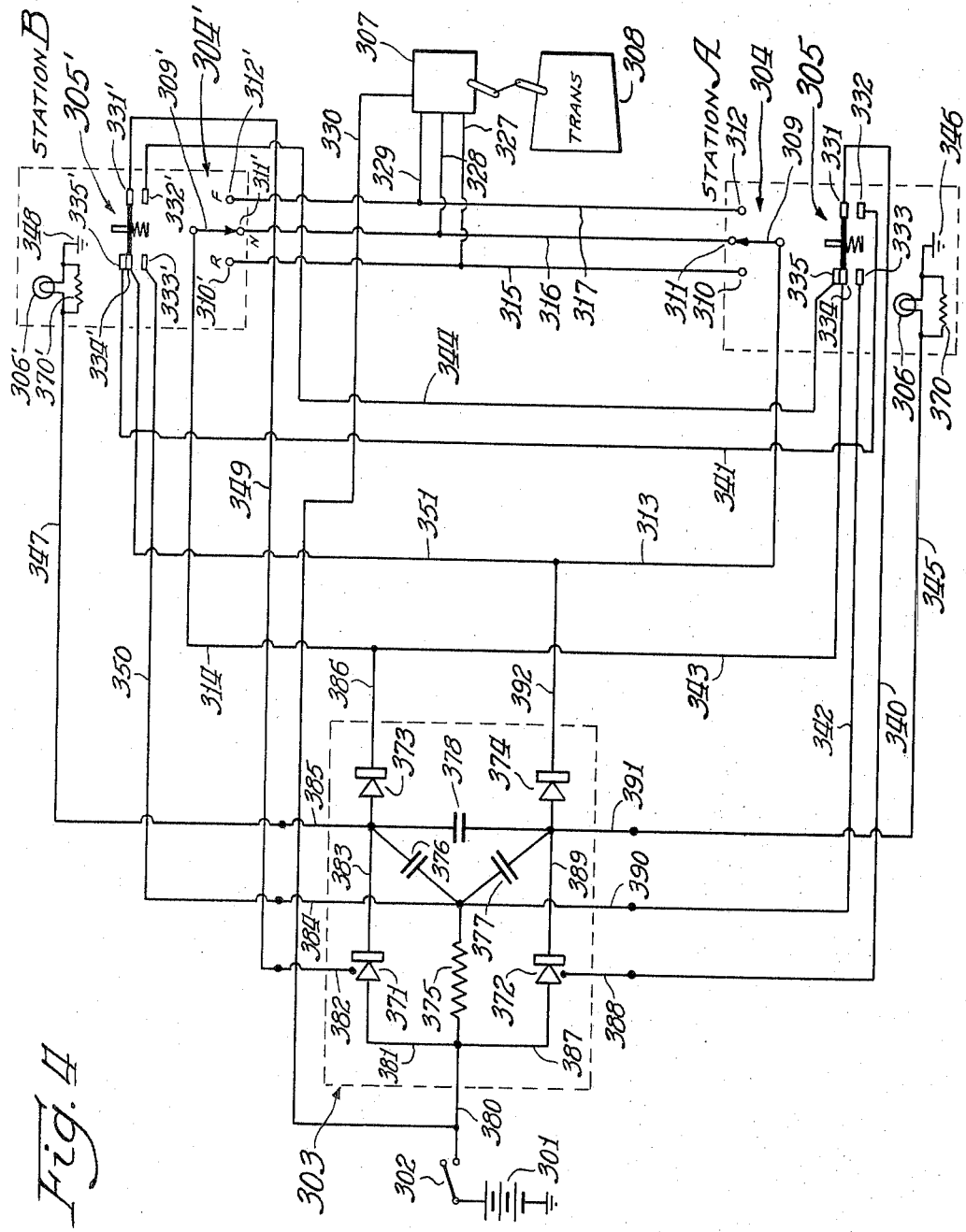

3,240,080
MULTI-STATION TRANSMISSION CONTROL
James D. Coffelt and William V. Harrison, Muncie, Ind., assignors to Borg-Warner Corporation, Chicago, Ill., a corporation of Illinois
Filed Sept. 7, 1962, Ser. No. 222,083
10 Claims. (Cl. 74—365)

This invention relates to a control system for a marine transmission.

The control system is designed for a marine transmission of the planetary type having forward, reverse, and neutral drive ratios; but it can be used with other types of transmissions wherein a plural station control system is desired. It is preferable, particularly on larger boats, to have a control system wherein the transmission drive ratio can be controlled from a plurality of remote stations. One of the problems existing in the known types of plural station marine transmission control systems is that a party can inadvertently take control of the transmission ratio at a station which has the ratio-selector switch in a ratio position different from that in which the transmission is operating. This could result either in damage to the transmission or possible swamping of the boat.

Accordingly, it is an object of this invention to provide a plural station control system for a marine transmission wherein a party cannot take control of the transmission ratio at a station wherein the ratio-selector switch is in a different ratio position than that in which the transmission is operating.

More particularly, it is an object of this invention to provide a plural station control system for a marine transmission wherein each control station has a selector switch having forward, neutral, and reverse positions; and an electrical interlock wiring circuit is utilized to prevent one control station from taking control of the transmission ratio unless the selector switch at that control station is in the same ratio position as the selector switch of the control station which has control.

The invention consists of the novel constructions, arrangements, and devices to be hereinafter described and claimed for carrying out the above-stated objects and such other objects as will be apparent from the following description of preferred forms of the invention, illustrated with reference to the accompanying drawings, wherein:

FIGURE 1 is a schematic diagram of one embodiment of the invention illustrating a dual-station control system including a rotary-solenoid type relay switch and also shows a schematic diagram of one type of marine transmission with which this control system may be used;

FIGURE 2 is a schematic diagram of a second embodiment of the invention illustrating a modified form of a dual-station control system including a magnetic reed type relay switch;

FIGURE 3 is a schematic diagram of a modified form of the control system providing three control stations embodying the principles of the invention; and FIGURE 4 is a schematic diagram of another modification of the invention illustrating a dual-station control system including an electronic switching means.

Like characters of reference designate like parts in the several views.

Referring to the drawings, the control means as shown in FIGURE 1 comprises a battery 1, an ignition switch 2, a station interlock control unit 3, shift control switches 4 and 4', station selector switches 5 and 5', station indicator lights 6 and 6', a shift motor 7, and a transmission 8. Remote control station A comprises shift control switch 4, station selector switch 5, and station indicator lamp 6. Remote control station B comprises shift control switch 4', station selector switch 5', and station indicator lamp 6'.

Shift switch 4 includes a contact arm 9 and contacts 10, 11, and 12. A shift lever (not illustrated) is provided for moving contact arm 9. Contact arm 9 is connected to wires 13 and 14, contact 10 is connected to wire 15, contact 11 is connected to wire 16, and contact 12 is connected to wire 17.

Station selector switch 5 includes contacts 18 and 19. Contact 18 is connected to wire 20 and contact 19 is connected to wire 14.

Indicator lamp 6 has one side of its filament connected to wire 21 and the other side connected to ground at 22.

Shift control switch 4' is identical to shift control switch 4 and has its contact arm 9' connected to wires 23 and 24, and its contacts 10', 11', and 12' connected respectively to wires 15, 16, and 17.

Indicator lamp 6' is identical to light 6 and is connected on one side to wire 25 and is grounded on the other side at 26.

The shift motor 7 is mounted on transmission 8 and can be of any suitable construction to operate the transmission shift lever or shift valve. The shift motor is connected to wires 27, 28, and 29. Wire 30 supplies the main power to shift motor 7 to operate it when it has been conditioned for a particular ratio by the contact arm of the station which has control.

The station interlock control unit 3 comprises a rotary-solenoid actuated stepping switch of a well-known type. Unit 3 comprises a wafer 31 and rotary solenoid 32. Wafer 31 has segments 33, 34, and 35 on one side thereof making contact at various times with contacts 36, 37, 38, 39, 40, 41, 42, and 43. Wafer 31 has segments 44, 45, and 46 on the other side thereof making contact at various times with contacts 47, 48, 49, and 50.

Wire 51 connects battery 1 through ignition switch 2 to contacts 40, 43, 47, and 50. Wire 52 connects contacts 36 and 39 to rotary solenoid 32. Rotary solenoid 32 is grounded at 53. Wire 54 connects contact 38 to contact 18' of station selector switch 5'. Wire 20 connects contact 37 to contact 18 of station selector switch 5. Wire 21 connects contact 42 to the filament of indicator lamp 6. Wire 25 connects contact 41 to the filament of indicator lamp 6'. Wire 13 connects contact 49 to contact arm 9 of shift control switch 4. Wire 23 connects contact 48 to control arm 9' of shift control switch 4'.

The transmission 8 which represents one type of transmission with which the above control system may be used, comprises an input shaft 55, a sun gear 57 drivingly connected to the input shaft, driven shaft 56, planetary carrier 58 integral with the driven shaft, a set of planetary gears 59 rotatably mounted on the carrier 58, a set of planetary gears 60 rotatably mounted on carrier 58, a ring gear 61, a brake 62 for ring gear 61, and direct drive clutch 63. The set of planetary gears 59 meshes with the ring gear 61 and planetary gears 60, the set of planetary gears 60 meshes with planetary gears 59 and with sun gear 57. This transmission provides forward, reverse, and neutral ratios corresponding with the forward, reverse, and neutral position of the contact arms 9 and 9', of the remote control stations.

With both brake 62 and clutch 63 released the transmission is in neutral. When clutch 63 is actuated, the ring gear 61 is locked to sun gear 57 forcing the planetary gear set to rotate as a unit, thus providing a direct forward drive ratio. When clutch 63 is released and brake 62 is actuated, the ring gear 61 acts as a reaction member for the planetary gear set. Sun gear 57 drives planetary gears 59 and 60 which walk around ring gear 61 and thereby rotate the driven shaft 56 in a reduced drive in the reverse direction. For a detailed description of the above planetary transmission, reference can be had to U.S. Patent Nos. 2,877,668 and 2,997,996.

The operation of the embodiment of FIGURE 1 is as follows: Assuming the controls are in the condition illustrated in FIGURE 1, station A has control of the transmission for selecting forward, neutral, or reverse through shift control switch 4. Power is supplied from battery 1, ignition switch 2, wire 51, contact 50, segment 46, contact 49, and wire 13 to contact arm 9 of shift control switch 4. Power is supplied from battery 1, ignition switch 2, wire 51, contact 40, segment 35, contact 42, wire 21, to the filament of indicator lamp 6. The lamp is on and indicates that station A has control.

When an operator at station B wishes to take control of the transmission, station selector switch 5' is momentarily closed by means of a push button not shown (switch 5' being spring retained to open position when the button is released). When switch 5' is closed, if contact arm 9' is in the same speed ratio position as contact arm 9, power will be supplied from battery 1 through ignition switch 2, wire 51, contact 50 segment 46, contact 49, wire 13, contact arm 9, wire 16, contact arm 9', wire 24, contacts 18' and 19', wire 54, contact 38, segment 34, contact 39, and wire 52 to rotary solenoid 32. Rotary solenoid 32 will then rotate wafer 31 thirty degrees clockwise and then stop. The operation of this known type of control switch is to rotate a certain number of degrees and stop each time power is momentarily supplied to the control switch.

When the rotary solenoid 32 rotates wafer 31 thirty degrees, power will then be supplied from battery 1, ignition switch 2, wire 51, contact 47, segment 45, contact 48, and wire 23 to contact arm 9'. Thus, station B now has control of the transmission since power is being supplied to station B through wire 23. No power is being supplied to station A at this time since segment 46 no longer makes contact with contact 49, and the circuit supplying power from battery 1 to wire 13 leading to station A is thereby broken. Power is also supplied at this time from battery 1 through ignition switch 2, wire 51, contact 43, segment 35, contact 41, wire 25 to the filament of indicator lamp 6'. Thus, indicator lamp 6' is on and indicates that station B has control. No power is supplied to indicator lamp 6 at this time since segment 35 no longer makes contact with contact 42; and therefore, the circuit from the battery 1 to wire 21, which leads to indicator lamp 6, is broken.

When it is desired to return the control to station A, station selector switch 5 is closed and the above procedure is reversed. Thus, it is apparent that the structure of the embodiment of FIGURE 1 allows the operator to change the control of the transmission from the station which has control to the station which he is operating. However, this can only be done, due to the interlock feature of this control system, when the operator has placed the shift lever in the same transmission ratio position as is the shift lever of the station which has the control. The interlock feature thus prevents possible injury to the transmission or possible swamping of a boat in marine installations by making it impossible for an operator to inadvertently take over the control of the transmission ratio selection when the shift lever at his station is in a different ratio-position than that of the station which has control.

The embodiment of FIGURE 2 is similar to that of FIGURE 1 with the exception that the rotary-solenoid actuated stepping switch used in station interlock control unit 3 has been replaced by a magnetic reed type switching mechanism or relay of a well-known type.

The numbers used in FIGURE 2 correspond to those of FIGURE 1 but are in the "100" series. The numbers the elements of FIGURE 2 which are equivalent to the elements shown in FIGURE 1 end in the same digits as the numbers for corresponding elements of FIGURE 1.

Only the station interlock control 103 will be described in detail since the other elements of the embodiment correspond directly with those of FIGURE 1 described above.

The station interlock control unit 103 utilizes a magnetic reed switch of a well-known type to perform the switching function. The station interlock control unit comprises a magnetic reed switch 170 and diodes 171 and 172. The magnetic reed switch 170 includes flexible arm 173, contact leads 174 and 175, a magnet having a north pole section 176 and a south pole section 177, and wires 178 and 179. A coil is formed in wire 178 which is surrounding the north pole section 176 of the magnet. A coil is formed in wire 179 surrounding the south pole section 177 of the magnet. The coil surrounding the north pole is wound in the opposite direction from the coil surrounding the south pole. Wires 178 and 179 are connected to wire 180 which is grounded at 181. Flexible arm 173 is connected to wire 151. Wire 178 is connected to wire 154, and wire 179 is connected to wire 120. Contact lead 174 is connected to wire 121, and contact lead 175 is connected to wire 125. Diode 172 is connected between wire 121 and wire 113. Diode 171 is connected between wire 125 and wire 123.

The operation of the control system of FIGURE 2 is as follows: Assuming the controls are in the condition illustrated in FIGURE 2, station B has control of the transmission through shift control switch 104'. Power is supplied to wire 151 by the battery and from line 151 to the flexible arm 173 of the magnetic reed switch 170. The flexible arm 173 as illustrated is electrically connected to contact lead 175. Power is supplied through contact lead 175 to wire 125 lighting lamp 106'. Power is also supplied through wire 125, diode 171, and wire 123 to arm 109' of the shift control switch 104'. Since power is now supplied to shift control switch 104', forward, neutral, or reverse condition of the transmission can be selected by moving the shift arm 109' to connect power to contacts 110', 111', or 112' respectively.

When the operator desires to switch control of the transmission to station A, he pushes station selector switch 105 which is only active when shift arm 109 is in the position which corresponds to the selected position of shift control switch 104'. When arms 109 and 109' are in corresponding positions and station selector switch 105 is closed, power is supplied to the coil surrounding the south pole 177 from wire 123, through arm 109', contact 111', wire 116, contact 111, contact arm 109, wire 114, station selector switch 105, and wire 120. When current passes through the coil around the south pole section 177 of the magnet, the magnetic field at the south pole increases in intensity to the point where flexible arm 173 is pulled over to make contact with contact lead 174. Power is now supplied from contact lead 174 through diode 172 and wire 113 to shift control switch 104. Station A now has control since shift control switch 104 is now energized. Power is also supplied through wire 121 through contact lead 174 to light lamp 106.

The magnetic reed switch 170 is designed so that when the coil around either of the north or south pole sections is energized, the direction of the winding is such as to increase the magnetic field surrounding that pole and pull the flexible arm 173 into contact with the corresponding contact lead. After the control has been shifted from one station to the other, the residual magnetism of either of the poles is great enough to hold the flexible arm in contact with the corresponding contact lead; and the opposite pole has insufficient strength to pull the flexible arm away from the contact lead of the opposite pole.

To shift the control back to station B, station selector switch 105' is closed; and the above procedure is reversed.

Diodes 171 and 172 are placed in the circuits to prevent lighting of the lamp of the station which does not have control. For example, when station A has control and if contact arm 109' of station B is in the same position as contact arm 109, power could be supplied through wires 123 and 125 thereby lighting lamp 106' while station A has control. Diode 171 will prevent lighting of the lamp 106' when station A has control since current can flow through diode 171 only in the direction of the arrow as seen in FIGURE 2.

In FIGURE 3, another embodiment is disclosed which provides a control system for three-station remote control of the transmission. Remote control stations A, B, and C are provided from any of which an operator may control the transmission. As in the previous embodiments, the control system insures that only one of the stations has control at a particular time. The station interlock control unit 203 of FIGURE 3 utilizes magnetic reed switches in a like manner as used in station interlock control unit 103 of FIGURE 2.

The control system illustrated in FIGURE 3 includes a battery 201, ignition switch 202, and station interlock control unit 203 for controlling stations A, B, and C. Stations A, B, and C have station selector switches 204, 205, and 206 respectively.

Station interlock control unit 203 comprises magnetic reed switches 207 and 208 and diodes 209, 210, and 211. Magnetic reed switch 207 comprises a flexible arm 212, a magnet having a north pole section 213 and a south pole section 214, and contact leads 215 and 216. Wire 217 has a coil formed therein surrounding the north pole section 213. Wire 218 has a coil formed therein surrounding the south pole section 214. Wires 217 and 218 are connected to wire 219 which is grounded at 220. Magnetic reed switch 208 comprises a flexible arm 221, a magnet having a north pole section 222, and a south pole section 223, and contact leads 224 and 225. Wire 226 has a coil formed therein surrounding north pole section 222, and wire 227 has a coil formed therein surrounding south pole section 223. Wires 226 and 227 are connected to wire 228 which is grounded in 229.

Indicator lamps 230, 231, and 232 are provided for stations A, B, and C respectively. Station C has contact arm 233 engageable with contacts 234, 235, and 236. Station B has contact arm 237 engageable with contacts 238, 239, and 240. Station A has contact arm 241 engageable with contacts 242, 243, and 244. The three contacts at each station represent the forward, neutral, and reverse positions of the respective contact arms.

Station selector switch 204 comprises contacts 245 and 246. Station selector switch 205 comprises contacts 247, 248, 249, and 250. Station selector switch 206 comprises contacts 251, 252, 253, and 254.

Wire 255 connects the ignition switch 202 to flexible arm 221 of the magnetic reed switch 208. Wire 256 connects ignition switch 202 to the shift motor for the transmission. Wire 257 connects flexible arm 212 of magnetic reed switch 207 to contact lead 224 of the magnetic reed switch 208. Wire 258 connects wire 217 of the magnetic reed switch 207 with contact 251 of the station selector switch 206. Wire 259 contacts contact lead 215 with indicator lamp 232. Wire 260 connects contact lead 215 through diode 209 to contact arm 233 of station C. Wire 261 connects wire 218 of magnetic reed switch 207 with contact 247 of the station selector switch 205. Wire 262 connects contact lead 216 with the indicator lamp 231. Wire 263 connects contact lead 216 through diode 210 with contact arm 237 of station B. Wire 264 connects wire 226 of magnetic reed switch 208 with contact 249 of station selector switch 205 and contact 253 of station selector switch 206. Wire 265 connects wire 227 of magnetic reed switch 208 and contact 245 of station selector switch 204. Wire 266 connects contact lead 225 with indicator lamp 230. Wire 267 connects contact lead 225 through diode 211 with contact arm 241 of station A. Wires 268, 269, and 270 interconnect the three contacts at each of the control stations (which represent the three ratios selectible at each station) with wires 271, 272, and 273 which run to the shift motor for the transmission.

Magnetic reed switches 207 and 208 are identical to magnetic reed switch 170 of FIGURE 2 described above and operate in a like manner. The operation of the control system of FIGURE 3 is as follows: With the system in the condition shown, station A has control of the transmission. Power is supplied from battery 201 through ignition switch 202, wire 255, flexible arm 221, contact lead 225, and wire 267 to contact arm 241 of station A. Power is also supplied from contact lead 225 through wire 266 to indicator lamp 230. Indicator lamp 230 is thus on and indicates that station A has control.

When the opeartor at station C wishes to take control, station selector switch 206 is actuated and momentarily closes contacts 251 and 252. Station selector switches 206 and 205 are of a delayed action type in which one set of contacts closes a short time before the other set of contacts closes. Assuming contact arm 233 of station C is in the same position as contact arm 241 of station A, power will be supplied from contact arm 241 of station A through wire 269 through contact arm 233 of station C when the contact arms are in the positions shown in FIGURE 3. Power is then supplied from contact arm 233 through contacts 252 and 251 of station selector switch 206, through wire 258, to wire 217 of magnetic reed switch 207. The coil around the north pole section 213 is thus energized, increasing the intensity of the magnetic field around north pole section 213 and thus pulling flexible arm 212 away from contact lead 216 and into contact with contact lead 215. The flexible arm 212 is thus positioned to supply power to station C. A short time after contacts 251 and 252 of station selector switch 206 close, contacts 253 and 254 will close; and power will now be supplied from contact arm 233 through contacts 254 and 253, wire 264, to wire 226 of magnetic reed switch 208. The coil around the north pole section 222 of magnetic reed switch 208 is thereby energized, and the intensity of the magnetic field around north pole section 222 will be increased thereby pulling flexible arm 221 away from contact lead 225 and into contact with contact lead 224. Power is now supplied from battery 201 through ignition switch 202, wire 255, flexible arm 221, contact lead 224, wire 257, flexible arm 212, contact lead 215, and wire 260 to contact arm 233 of station C. Power is also supplied from contact lead 215 through wire 259 to indicator lamp 232. Indicator lamp 232 is thus on and indicates that station C has control. Since flexible arm 221 is no longer in contact with contact lead 225, there is no power being supplied to station A.

Diodes 209, 210, and 211 permit the flow of current only in the direction of the arrows and thus prevent the lamps at the stations which do not have control from being supplied with power. For example, when station C has control, power could be supplied from contact arm 233 through wire 269, contact arm 241, wire 267, and wire 266 to indicator lamp 230. Thus, the indicator lamp at station A would ordinarily be on at the same time as the indicator lamp at station C. However, diode 211 prevents feed back current from lighting lamp 230 since the diode prevents flow of current in the direction opposite to that of the arrow.

If an operator at station B wishes to take control, station selector switch 205 is actuated; and the above procedure is repeated. If an opeartor at station A wishes to take control while stations B or C have control, station selector switch 204 is actuated. Taking control at station A does not require the use of a double contact switch such as switches 205 and 206 used in stations B and C respectively. Since the battery is connected by wire 255 to the flexible arm 221 of magnetic reed switch 208, actuation of only magnetic reed switch 208 is necessary to perform the station control switching function; and thus, only a single set of contacts is required for station selector switch 204.

In FIGURE 4 a schematic diagram of another embodiment is disclosed wherein a modified form of a dual station control system utilizing an electronic switching means is llustrated.

Referring to the drawings, the control means as shown in FIGURE 4 comprises a battery 301, an ignition switch 302, a station interlock control unit 303, shift control switches 304 and 304', station selector switches 305 and 305', station indicator lights 306 and 306', a shift motor 307, and a transmission 308. Remote control station A comprises shift control switch 304, station selector switch 305, and station indicator light 306. Remote control station B comprises shift control switch 304', station selector switch 305', and station indicator light 306'.

Shift switch 304 includes a contact arm 309 and contacts 310, 311, and 312. A shift lever not illustrated is provided for moving contact arm 309. Contact arm 309 is connected to wire 313, contact 310 is connected to wire 315, contact 311 is connected to wire 316, and contact 312 is connected to wire 317.

Station selector switch 305 includes contacts 331, 332, 333, 334, and 335. Contact 331 is connected to wire 340, contact 332 is connected to wire 341, contact 333 is connected to wire 342, contact 334 is connected to wire 343, and contact 335 is connected to wire 344.

Indicator light 306 has one side of its filament connected to wire 345 and the other side connected to ground at 346. Resistor 370 is connected in parallel with indicator light 306.

Shift control switch 304' is identical to shift control switch 304 and has its contact arm 309' connected to wire 314, and its contacts 310', 311', and 312' connected respectively to wires 315, 316, and 317.

Station selector switch 305', includes contacts 331', 332', 333', 334', and 335'. Contact 331, is connected to wire 349, contact 332' is connected to wire 344, contact 333' is connected to wire 350, contact 334' is connected to wire 351, and contact 335' is connected to wire 341.

Indicator light 306' is identical to light 306 and is connected on one side to wire 347 and is grounded on the other side at 348. There is also a resistor 370' connected in parallel with indicator light 306'.

The station interlock control unit 303 comprises silicon control rectifiers 371 and 372; diodes 373 and 374; resistor 375; and capacitors 376, 377, and 378. Wire 380 is connected to wire 381, resistor 375, and wire 387. SCR (silicon control rectifier) 371 is connected to wires 381, 382, and 383. Diode 373 is connected at one end to wire 383, one end of capacitor 376, one end of capacitor 378, and wire 385 and at the other end to wire 386. SCR 372 is connected to wires 387, 388, and 389. Diode 374 is connected to wire 389, one end of capacitor 377, one end of capacitor 378, and wires 391, and 392. The other end of resistor 375 is connected to the other ends of capacitors 376 and 377 and to wires 384 and 390.

The operation of the embodiment of FIGURE 4 is as follows: When the ignition switch is initially turned on, neither of the SCR's 371 nor 372 are conducting; therefore, one of the station selector switches must be depressed to activate the circuit. To condition the SCR 372 for current conduction and thus activate station A, the lever arms 309 and 309' must first be placed in corresponding positions which as shown is the neutral position. Depressing selector station switch 305 closes contacts 331 and 332 and contacts 333 and 334, allowing current to flow from battery 301 through ignition switch 302, wire 380, resistor 375, wire 390, wire 342, contacts 333 and 334, wire 343, wire 314, arm 309', contact 311', wire 316, contact 311, wire 309, wire 51, contact 334', 335', wire 341, contacts 332 and 331, wire 340, and wire 388 to activate SCR 372. The station selector switch 305 is now released and SCR 372 is conducting and current is supplied to switch 304 from battery 301 through ignition switch 302, wire 380, wire 387, SCR 372, wire 389, diode 374, wire 392, wire 313, to arm 309. Switch 304 is now effective to actuate forward, neutral, and reverse by moving arm 309 to contacts 310, 311, and 312 respectively.

When SCR 372 is conducting, a charge is built up on one side of capacitor 378 due to the potential difference between wires 383 and 389. When SCR 372 is conducting, current is also supplied to indicator light 306 which lights the light to indicate that station A is operative.

When station A is operative and an operator at station B desires to take over the control, he can do so by depressing switch 305' provided lever arms 309 and 309' are in corresponding positions. That is, both in forward, neutral, or reverse. When switch 305' is depressed, current is supplied from lever arm 309, contact 311, wire 316, contact 311', lever arm 309', wire 314, wire 343, contacts 334 and 335, wire 344, contacts 332' and 331', and wire 349, to activate SCR 371. When SCR 371 is activated, current starts flowing from the battery through wires 380 and 381, SCR 371, wire 383, diode 373, wires 386, and 314, and lever arm 309', to switch 304', which is now active to actuate the shift motor.

When SCR 371 starts conducting, the potential difference between wires 383 and 389 is reversed and the charge on the one side of the capacitor 378 discharges through wires 391, 345, and indicator light 306. When the capacitor discharges through indicator light 306, it relieves the load on SCR 372 which places SCR 372 in its non-conducting condition and cuts off the current flow through this SCR. When SCR 371 is conducting, the charge on capacitor 378 is built up on the other side; and current is supplied to indicator light 306 from wire 383 to wires 385 and 347, which lights the light to indicate that station B is now operative.

If the operator again desires to switch the control to station A, the above procedure is reversed.

It should be noted that since wires 315, 316, and 317 are always in the switching circuit that lever arms 309 and 309' must be in the same corresponding positions to complete the circuit.

Capacitors 376 and 377 are used as spike suppressors only and play no active part in the switching from one station to the other, other than suppressing voltage spikes which might cause false activation of the SCR's.

Resistors 370 and 370' are placed in parallel with the indicator lights so that the circuit will remain complete even though the filaments in the indicator lights may be burned out. It is imperative that a complete circuit from battery to ground through the SCR's be maintained because of the construction of the SCR's which causes them to be placed in a non-conductive condition as soon as there is no current flow.

The diodes 373 and 374 are in the circuit to prevent feed back from the station which is active through wires 315, 316, or 317 when lever arms 309 and 309' are in the same position which would give a false indication by lighting the indicator lights that a station had control. That is, the diodes only let current flow in one direction; and if station A has control, the indicator light at station A would normally be on, but the indicator light at station B should be off. However, without the diodes, and when both lever arms 309 and 309' are in the same corresponding position, there would be a feed back through wires 315, 316, or 317, through wires 314, 386, 385, and 347 to the indicator light.

From the foregoing description, it will be apparent that the embodiment of FIGURE 4 has the interlock control feature, as have the other embodiments. That is to say, an operator cannot take control of the transmission at a station other than the one that has control unless the contact arm is first placed in the same transmission ratio position as is the contact arm of the station which has control.

It is to be understood that our invention is not to be limited to the specific constructions and arrangements shown and described except only insofar as the appended claims may be so limited, as it will be apparent to those skilled in the art that changes may be made without departing from the principles of the invention.

What is claimed is:

1. In a marine transmission having forward, neutral, and reverse drive ratios; a control circuit; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit operatively connected to said ratio selecting means; said interlock means being operative to connect a selected one of said ratio selecting means to said source of energy and thereby enable said one ratio selecting means to actuate said shift means; said ratio selecting means each including means operable to actuate said interlock means; and said interlock means being operative to energize another of said ratio selecting means when actuated by said another ratio selecting means and only when said another ratio selecting means is in the same of said positions as said one ratio selecting means.

2. A transmission as claimed in claim 1 wherein said control circuit comprises an electrical control circuit and said shift means comprises an electric shift motor for establishing the drive ratios through said transmission.

3. In a marine transmission having forward, neutral, and reverse drive ratios; an electrical control circuit for said transmission; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit operatively connected to said ratio selecting means; said interlock means comprising electric switch means operative to connect a selected one of said ratio selecting means to said source of energy; said ratio selecting means each including means operable to actuate said electric switch means and said switch means being operative to connect another of said ratio selecting means to said source of energy when actuated by said another ratio selecting means and only when said another ratio selecting means is in the same of said positions as said one ratio selecting means.

4. In a marine transmission having forward, neutral, and reverse drive ratios; an electric control circuit for said transmission; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit operatively connected to said ratio selecting means; said interlock means comprising a rotary solenoid actuated switch means operative to connect one of said ratio selecting means to said source of energy thereby enabling said one ratio selecting means to actuate said shift means; and said switch means being operative to connect a second of said ratio selecting means to said source of energy only when said second ratio selecting means is in the same of said positions as said one ratio selecting means.

5. In a marine transmission having forward, neutral, and reverse drive ratios; an electric control circuit for said transmission; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit; said interlock means including a rotary solenoid actuated switch means; said switch means comprising a wafer member having a plurality of electrically conductive segments thereon cooperating with a plurality of electrical contacts, a rotary solenoid connected to said wafer and actuatable in response to an electrical impulse to rotate said wafer through a predetermined angle, said electrical contacts having wires connected thereto running to said ratio selecting means and running to said source of energy, said switch means being operative to electrically connect a selected one of said ratio selecting means to said source of energy through said contacts and said segments and thereby enable said one ratio selecting means to actuate said shift means; and said switch means being operative to electrically connect a second of said ratio selecting means to said source of energy and disconnect said one ratio selecting means by rotation of said wafer means through said predetermined angle in response to an electric impulse from said second ratio selecting means only when said second ratio selecting means is in the same of said positions as said one ratio selecting means.

6. In a marine transmission having forward, neutral, and reverse drive ratios; an electric control circuit for said transmission; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit operatively connected to said ratio selecting means; said interlock means comprising a magnetic reed switching mechanism operative to electrically connect one of said ratio selecting means to said source of energy thereby enabling said one ratio selecting means to actuate said shift means; and said switching mechanism being operative to electrically connect a second of said ratio selecting means to said source of energy and disconnect said one ratio selecting means from said source of energy to enable said second ratio selecting means to actuate said shift means only when said second ratio selecting means is in the same of said positions as said one ratio selecting means.

7. In a marine transmission having forward, neutral, and reverse drive ratios; an electric control circuit for said transmission; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit; said interlock means including a magnetic reed type switch means; a magnetic field operatively associated with said switch means and actuatable in response to an electric impulse to operate said switch means; said electric circuit connecting said switch means to said ratio selecting means and to said source of energy; said switch means being operative to electrically connect a selected one of said ratio selecting means to said source of energy through said switch means and thereby enable said one ratio selecting means to actuate said shift means; and said switch means being operative to electrically connect a second of said ratio selecting means to said source of energy and to disconnect said one ratio selecting means from said source of energy through operation of said switch means in response to an electrical impulse from said second ratio selecting means only when said second ratio selecting means is in the same of said positions as said one ratio selecting means.

8. In a marine transmission having forward, neutral, and reverse drive ratios; an electric control circuit for said transmission; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit operatively connected to said ratio selecting means; said interlock means comprising a pair of silicon control rectifiers operative to connect one of said ratio selecting means to said source of energy thereby enabling said one ratio selecting means to actuate said shift means;

and said silicon control rectifiers being operative to connect a second of said ratio selecting means to said source of energy only when said second ratio selecting means is in the same of said positions as said one ratio selecting means.

9. In a marine transmission having forward, neutral, and reverse drive ratios; an electric control circuit for said transmission; a source of energy for said circuit; shift means in said circuit operatively connected to said transmission and adapted to establish said drive ratios; a plurality of ratio selecting means in said circuit operatively connected to said shaft means and each having forward, neutral, and reverse positions; interlock means in said circuit; said interlock means including a pair of silicon control rectifiers; said silicon control rectifiers being operative to conduct current to one of said ratio selecting means in response to an electric impulse; said electric circuit connecting said silicon control rectifiers to said ratio selecting means and to said source of energy; said silicon control rectifiers being operative to electrically connect a selected one of said ratio selecting means to said source of energy through said silicon control rectifiers and thereby enable said one ratio selecting means to actuate said shift means; and said silicon control rectifiers being operative to electrically connect a second of said ratio selecting means to said source of energy and to disconnect said one ratio selecting means from said source of energy through operation of said silicon control rectifiers in response to an electrical impulse from said second ratio selecting means only when said second ratio selecting means is in the same of said positions as said one ratio selecting means.

10. In a marine transmission having forward, neutral, and reverse drive ratios; an electric control circuit for said transmission; a source of energy for said circuit; shift means in said circuit operatively connected to said transmission and adapted to establish said drive ratios; a plurality of ratio selecting means in said circuit operatively connected to said shift means and each having forward, neutral, and reverse positions; interlock means in said circuit operatively connected to said ratio selecting means; said interlock means including electric switch means; said electric switch means being operative to electrically connect a selected one of said ratio selecting means to said source of energy and thereby enable said one ratio selecting means to actuate said shift means; said electric switch means being operative to electrically connect a second of said ratio selecting means to said source of energy and disconnect said one ratio selecting means from said source of energy only when said second ratio selecting means is in the same of said positions as said one ratio selecting means; said second ratio selecting means including switch means operative to electrically connect said first-named switch means momentarily to said source of energy to actuate said first-named switch means so as to connect said second ratio selecting means to said source of energy when said second ratio selecting means is in the same of said positions as said one ratio selecting means.

References Cited by the Examiner

UNITED STATES PATENTS

| | | |
|---|---|---|
| 2,358,094 | 9/1944 | Panish. |
| 2,482,300 | 9/1949 | Stevens et al. |
| 2,540,710 | 2/1951 | Bush. |
| 2,702,615 | 2/1955 | Morse. |
| 2,705,485 | 4/1955 | Morse. |
| 3,106,852 | 10/1963 | Miller _____ 74—365 |

DON A. WAITE, *Primary Examiner.*